(12) United States Patent
Kim

(10) Patent No.: US 9,356,468 B2
(45) Date of Patent: May 31, 2016

(54) ON/OFF SWITCH AND STANDBY POWER SHUTOFF DEVICE USING SAME

(76) Inventor: Chang-Ho Kim, Seoul (KR)

(*) Notice: Subject to any disclaimer, the term of this patent is extended or adjusted under 35 U.S.C. 154(b) by 685 days.

(21) Appl. No.: 13/704,144

(22) PCT Filed: Jun. 10, 2011

(86) PCT No.: PCT/KR2011/004255
§ 371 (c)(1),
(2), (4) Date: Dec. 13, 2012

(87) PCT Pub. No.: WO2011/159066
PCT Pub. Date: Dec. 22, 2011

(65) Prior Publication Data
US 2013/0088097 A1  Apr. 11, 2013

(30) Foreign Application Priority Data
Jun. 14, 2010  (KR) .................. 10-2010-0055763

(51) Int. Cl.
*H01H 47/00* (2006.01)
*H02J 9/00* (2006.01)

(52) U.S. Cl.
CPC . *H02J 9/00* (2013.01); *H02J 9/005* (2013.01); *Y10T 307/944* (2015.04)

(58) Field of Classification Search
USPC ........................................................ 307/140
See application file for complete search history.

(56) References Cited

U.S. PATENT DOCUMENTS

| | | | |
|---|---|---|---|
| 3,904,896 A * | 9/1975 | Guntersdorfer | B05B 17/0623 310/318 |
| 4,194,482 A * | 3/1980 | Jackson | F02P 1/083 123/149 D |
| 5,163,844 A * | 11/1992 | Hollis, Jr. | G09B 19/0061 434/327 |
| 5,844,516 A | 12/1998 | Viljanen | |
| 6,462,967 B1 | 10/2002 | Fujisawa | |
| 8,198,758 B2 | 6/2012 | Kim | |
| 8,793,819 B2 * | 8/2014 | Seo | E03D 9/08 4/443 |
| 2002/0195880 A1 | 12/2002 | Bij De Leij et al. | |
| 2006/0158485 A1 | 7/2006 | Hill | |
| 2009/0031147 A1 * | 1/2009 | Horvat | H02J 17/00 713/300 |
| 2013/0088097 A1 * | 4/2013 | Kim | H02J 9/005 307/140 |
| 2013/0249320 A1 * | 9/2013 | Lam | H01H 47/00 307/140 |

FOREIGN PATENT DOCUMENTS

CN  2614757 Y  5/2004
(Continued)

*Primary Examiner* — Ronald W Leja
(74) *Attorney, Agent, or Firm* — Jefferson IP Law, LLP

(57) ABSTRACT

A standby power shutoff device is provided that includes a switch generating power when turning on and generating an "on" signal using the power, a switching unit generating an "on/off" signal for a product, a power supply unit providing power for function units of the product by receiving an external input power, a power switching unit driven in response to a driving signal to cut off or connect a power supply path for the input power provided to the power supply unit, a control unit generating a control signal for powering off the product in response to an "off" signal from the switching unit, and a driving unit receiving power from the "on" signal from the switching unit, driving the power switching unit to connect the power supply path, and driving the power switching unit to cut off the power supply path in response to a "power off" control signal.

12 Claims, 4 Drawing Sheets

(56) References Cited

FOREIGN PATENT DOCUMENTS

| | | | |
|---|---|---|---|
| FR | 2 787 254 A1 | 6/2000 |
| JP | 3-47221 A | 2/1991 |
| JP | 10-164763 A | 6/1998 |
| JP | 11-71947 A | 3/1999 |
| JP | 2000-232728 A | 8/2000 |
| JP | 2002-78232 A | 3/2002 |
| JP | 2002-238152 A | 8/2002 |
| JP | 2005-115889 A | 4/2005 |
| JP | 2006-202744 A | 8/2006 |
| JP | 2009-148061 A | 7/2009 |
| JP | 2010-29515 A | 2/2010 |
| KR | 10-2004-0020344 A | 3/2004 |
| KR | 10-2004-0020667 A | 3/2004 |
| KR | 10-2009-0129531 A | 12/2009 |
| KR | 10-2009-0130800 A | 12/2009 |
| KR | 10-0945213 B1 | 3/2010 |
| KR | 10-2010-0057457 A | 5/2010 |
| WO | 00/35064 A1 | 6/2000 |
| WO | 2008/119997 A1 | 10/2008 |

\* cited by examiner

ON/OFF SWITCH AND STANDBY POWER SHUTOFF DEVICE USING SAME

TECHNICAL FIELD

The present invention generally relates to an apparatus for cutting off standby power which is wasted when various appliances/electronic products are powered "off", if power plugs connected to the appliance/electronic products are not pulled out. The present invention specifically relates to a standby power cut-off apparatus that completely cuts off the standby power without pulling out a power plug and an on/off switch for an on/off operation that can be applied thereto.

BACKGROUND ART

In general, an appliance/electronic product is provided with 110 V or 220 V of AC commercial power to an internal power unit by connecting a power plug of the product to a socket installed in a home or office, and using the power by converting the commercial power to a normal DC operating power by a power unit. The appliance/electronic product consumes minimum necessary power, that is, standby power, for operating an on/off switch that generates a signal for detecting a powering on/off operation by a user and for driving the power switching unit for supplying power to the power unit even in the general powered off state.

The surest way to cut off the standby power is to pull out a power plug from a socket, but it is very cumbersome to perform the operation every time the user do not use the product and the standby power is continuously consumed since the power plug is generally kept connected.

Accordingly, in order to reduce the standby power, various standby power reducing sockets and standby power reducing devices have been studied and provided. Especially, in order to reduce the standby power, countries of the world restricts standby power of all the electronic products to 1 W or less and introduce programs for gradually reinforcing the regulations.

However, since the restrictions do not regulate the power factor, the overall power production amount of the countries is not greatly different before and after the restriction, the waste of the energy is the same as before the restriction, and the $CO_2$ generation amount caused by the power production remains the same. Therefore, the environment is kept contaminated. In addition, since an additional complicated configuration for satisfying the restriction in which the standby power is maintained to be 1 W or less is incorporated, there has been a problem of increasing the product price.

DETAILED DESCRIPTION OF THE INVENTION

Technical Problem

Therefore, the present invention is conceived in order to solve the problems in the conventional art as described above and provides a standby power cut-off apparatus that completely cuts off the standby power as the power plug is pulled out if the appliance/electronic product is powered off even when the power plug of the appliance/electronic product is inserted.

Technical Solution

In order to achieve the purpose as described above, an aspect of the present invention provides a standby power shutoff device of an appliance/electronic product, including: an on/off switching unit that self-generates power by a mechanical movement of a first knob by a turning-on control, includes a self-generating on/off switch generating an "on" signal with the power, and generates an on/off signal of the product; a power unit that provides power for operating internal function units of the product by being provided with external input power; a power switching unit that is driven by a driving signal and cuts off or connects a power supply path of the external input power supplied to the power unit; a control unit that generates a control signal for powering off the product by the "off" signal generated from the on/off switching unit; and a driving unit that obtains driving power by on-signal power generated from the on/off switching unit, drives the power switching unit to connect the power supply path, and drives the power switching unit to cut off the power supply path according to a control signal for powering off supplied from the control unit.

According to another aspect of the present invention, the present invention provides a self-generating on/off switch for an on/off operation of an appliance/electronic product, including: an on-switch module that self-generates power by a mechanical movement of a first knob according to a turning-on control, and generates an "on" signal with the power; and an off-switch module that generates an "off" signal according to contact-or-separation of the contact point by an operation of the first knob or a second knob provided in addition to the first knob.

Advantageous Effects

As described above, the on/off switch and the standby power cut-off apparatus according to the present invention may completely cut off the standby power without pulling out the power plug when the appliance/electronic product is powered "off", so there is no need to manage the power factor. If the apparatus according to the present invention is applied to all products, a country's power generation amount wasted by the standby power is reduced by 100%, and in addition, $CO_2$ generated at the time of the power production is reduced to prevent the environmental contamination of the Earth.

MODE FOR CARRYING OUT THE INVENTION

Various aspects are now described with reference to the drawings. In the following, a dial knob, a microcomputer, a press knob, a latching relay, a stick-shaped press knob, and the like are described, but they are provided only for easier understanding of the present invention. Further, various specific definitions found in the following description are provided only to help general understanding of the present invention, and it is apparent to those skilled in the art that the present invention can be implemented without such definitions.

Figure 1A:
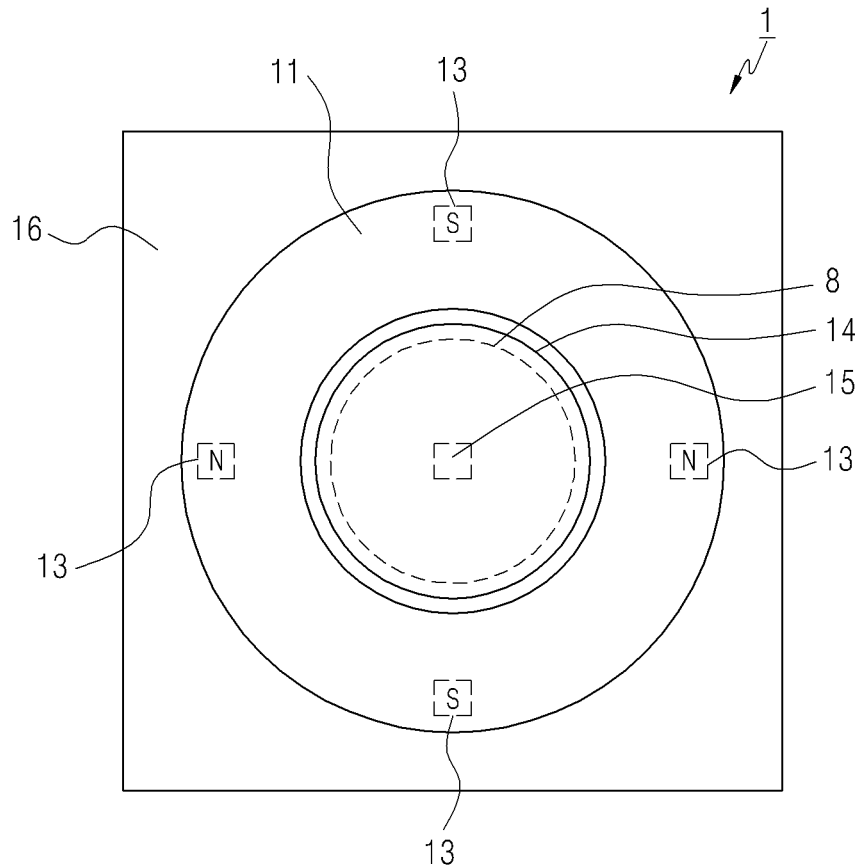
FIGS. 1A and 1B are diagrams schematically illustrating a structure of a self-generating on/off switch according to a first embodiment of the present invention.
Figure 1B:
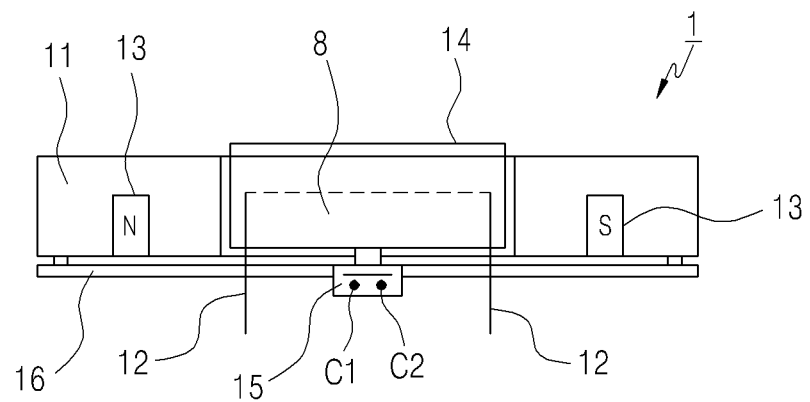

FIGS. 1A and 1B are diagrams schematically illustrating a structure of a self-generating on/off switch according to a first embodiment of the present invention, FIG. 1A is a plan view of the structure and FIG. 1B is a side view of the structure. The self-generating on/off switch according to the present invention illustrated in FIGS. 1A and 1B employed as a switch for an on/off operation for working an appliance/electronic product that requires a corresponding standby power cut-off. At this point, the self-generating on/off switch according to the present invention distinctively includes a structure that self-generates power for a turning-on signal and a turning-on operation at the time of an "on" operation.

That is, when the corresponding product is in an "off" state, standby power is completely cut off by turning off a power switching unit installed on a power supply path to a power unit that is provided with external power and generates power for operating a corresponding product. At this point, at the time of turning on the corresponding product, the present invention self-generates power for operating the power switching unit at the self-generating on/off switch.

Referring to FIG. 1, a self-generating on/off switch 1 according to the first embodiment of the present invention self-generates power with the mechanical movement of a first knob (a dial knob 11) by the turning-on operation of a user, and generates the turning-on signal with the power. The self-generating on/off switch 1 may include an on-switch module generating an "on" signal and an off-switch module generating an "off" signal, and may be implemented by, for example, a tube-shaped dial knob 11 that is installed on a plate 16 in a rotatable manner and including a hollow and a press knob 14 that is provided in the hollow of the dial knob 11 and that can be pressed.

Inside the dial knob 11, a plurality of permanent magnets 13 for power generation are installed with north poles and south poles alternately arranged in appropriate places, and a coil 8 for power generation is installed inside the press knob 14. Accordingly, when the dial knob 11 is rotated, the permanent magnets 13 arranged therein rotate about the press knob 14 as a rotation axis so that N poles and S poles are alternately changed, and therefore the current is generated in the coil 8 provided in the press knob 14. The generated current is generated through an input-output line 12 connected to the coil 8. Accordingly, the permanent magnets 13 installed in the dial knob 11 and the coil 8 provided in the press knob 14 are connected with each other to form a generation structure.

Meanwhile, the off-switch module that generates the "off" signal in the self-generating on/off switch 1 may be implemented through the press knob 14 and the tact switch 15. That is, the operation of pressing the press knob 14 is to be provided with an operation for powering off the corresponding apparatus from the user. The tact switch 15 connected with the press knob 14 is provided to come into contact with the lower portion of the press knob 14. When the press knob 14 is pressed, contact points C1 and C2 of the tact switch 15 are connected, and when the press knob 14 is unpressed, the press knob 14 comes back to the original place by the power of a spring in the tact switch 15 so that contact points C1 and C2 of the tact switch 15 are separated.

The self-generating on/off switch 1 may be configured according to the first embodiment of the present invention as described above. In the configuration, the dial knob 11 may have a rotatable structure and also have a structure in which the entire dial knob 11 is pressed. In that case, a tact switch is installed below the dial knob so that an "off" signal is generated by the tact switch when the dial knob is pressed. In addition, the self-generating on/off switch 1 may have various structures according to the present invention.

Figure 2A:
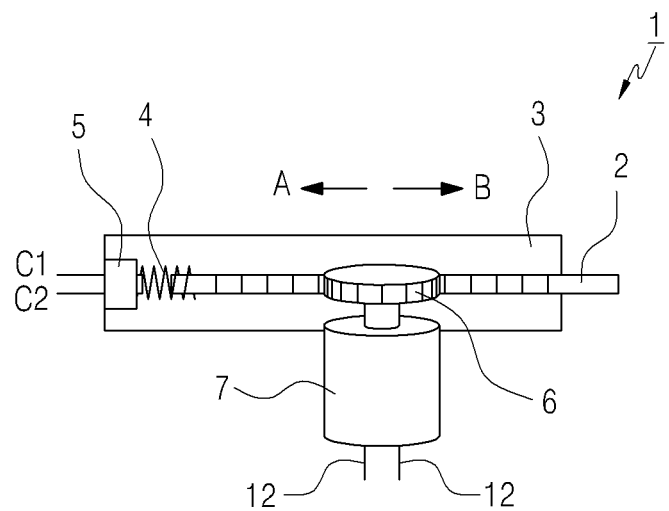
FIGS. 2A and 2B are drawings schematically illustrating the structure of the self-generating on/off switch according to a second embodiment of the present invention.
Figure 2B:
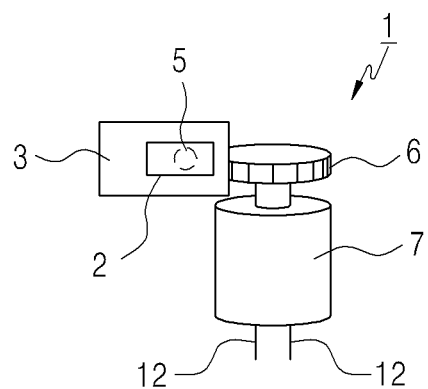

FIGS. 2A and 2B are drawings schematically illustrating the structure of the self-generating on/off switch according to a second embodiment of the present invention. FIG. 2A is a plan view of the structure and FIG. 2B is a side view of the structure. Referring to FIGS. 2A and 2B, the self-generating on/off switch 1 according to the second embodiment of the present invention self-generates power by the mechanical movement of the first knob (stick-shaped press knob 2) by a user performing a turning-on operation and generates the turning-on signal with the power. Basically, the self-generating on/off switch 1 includes a small generator 7 and a rotatable pinion gear 6 that is connected with a rotor of the small generator 7 and a stick-shaped press knob 2 having a rack gear structure connected with the pinion gear 6. In addition, the self-generating on/off switch 1 may include a supporting member 3 that supports and guides the movement of the stick-shaped press knob 2.

With the structure above, when the stick-shaped press knob 2 is pressed in the A direction, the pinion gear 6 engaged with the rack gear structure of the stick shaped knob 2 rotates to rotate the rotor of the generator 7 so that the power is generated. The stick-shaped press knob 2 includes a spring 4 for providing restoration force, so when the pressed stick-shaped press knob 2 is unpressed, the spring 4 moves back in the B direction so that the stick-shaped press knob 2 comes back to the original position.

Meanwhile, when the user performs an operation of pressing the stick-shaped press knob 2, the power of the apparatus may be powered off (that is, the operation of the stick-shaped press knob may turn on the corresponding apparatus when the corresponding product is in an "off" state, and may turn off the corresponding product when the corresponding apparatus is in an "on" state). For the configuration, a photo-coupler 5 that generates an "off" signal, when the stick-shaped press knob 2 is pressed, may be provided. That is, when the stick-shaped press knob 2 is pressed, light generated from a light emitting device of the photo-coupler 5 is blocked by one end of the press knob 2 and the pressed spring 4 so that the light is not input to the light receiving element.

Herein, a standby power cut-off apparatus according to the first embodiment of the present invention that is provided with the self-generating on/off switch according to the first or second embodiment of the present invention may be described in detail with reference to FIG. 3

Figure 3:
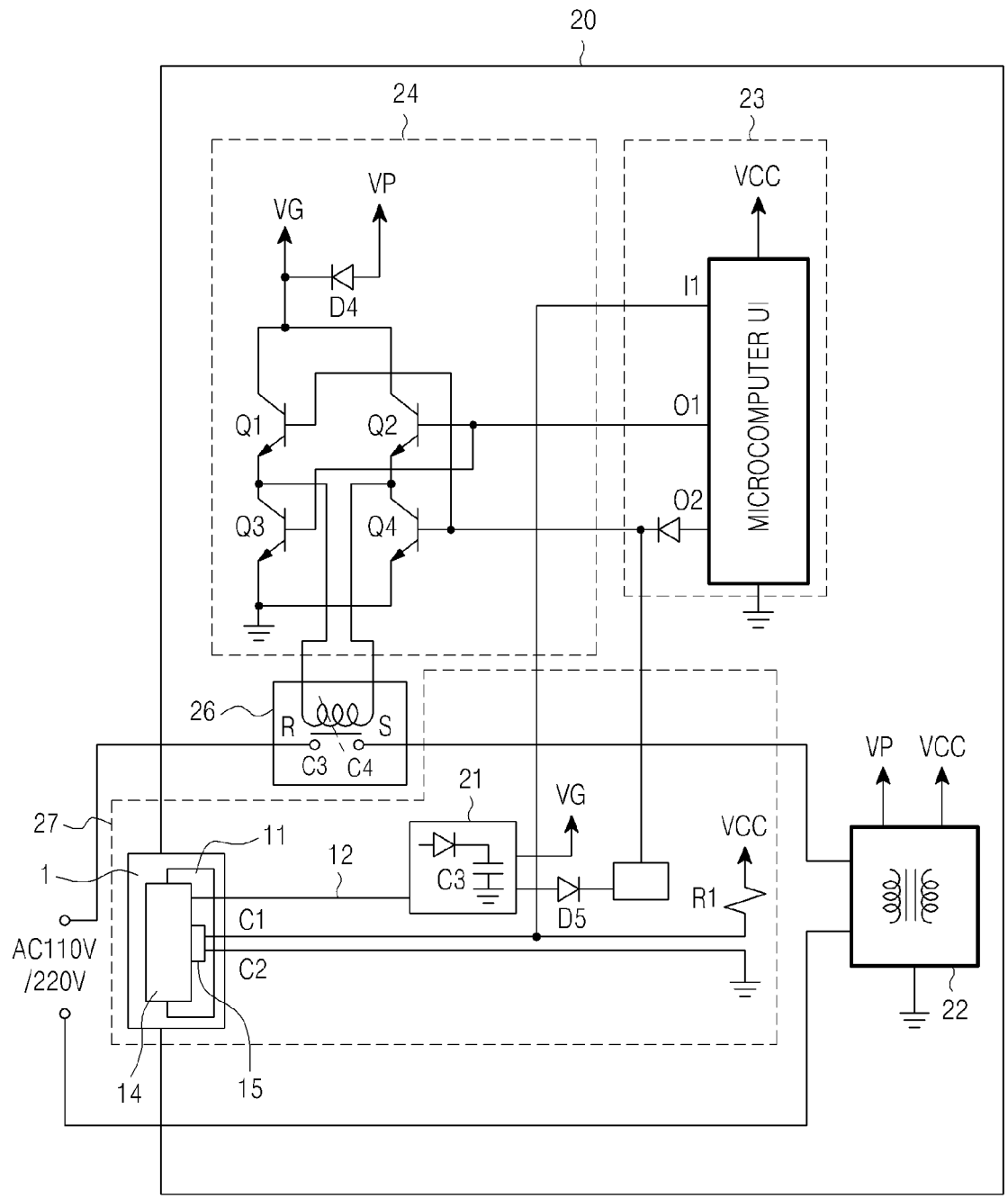
FIG. 3 is a block diagram illustrating a circuit of corresponding units of the appliance/electronic product provided with the standby power cut-off apparatus according to the first embodiment of the present invention.

FIG. 3 is a block diagram illustrating a circuit of corresponding units of the appliance/electronic product provided with the standby power cut-off apparatus according to the first embodiment of the present invention. With reference to FIG. 3, the standby power shutoff device according to the first embodiment of the present invention basically includes: an on/off switching unit 27 that includes the self-generating on/off switch 1 as illustrated in FIGS. 1A, 1B, 2A, and 2B, and generates an on/off signal for powering on or off a corresponding product; a power unit 22 that provides power for operating respective internal function units of the corresponding product 20 by being provided with an external input power; a power switching unit 26 that cuts off or connects a power supply path of the input power driven by a driving signal and provided by the power unit; a control unit 23 that generates a control signal for powering off the power of the corresponding product by the "off" signal generated from the on/off switching unit 27; and a driving unit 24 that obtains the on-signal power signal generated from the on/off switching unit 27, drives the power switching unit 26 to connect the power supply path, and drives the power switching unit to cut off the power supply path according to the control signal for powering off the power provided from the control unit 23. At this time, the self-generating on/off switch 1 employs the structure of the first embodiment illustrated in FIG. 1, for example.

The power unit 22 may be configured to be provided with 110 V or 220 V of commercial AC power and to generate, for example, 12 V or 5 V of power VCC and VP for operating the product.

The power switching unit 26 may be implemented by the latching relay for powering on and off simply by a driving signal.

The control unit 23 may be implemented by a microcomputer U1 in order to control the entire operation states, calculations, and determinations.

The on/off switching unit 27 may only include the self-generating on/off switch 1 as illustrated in FIGS. 1A, 1B, 2A, and 2B. In addition, in a structure in which the self-generating on/off switch 1 generates AC electric power according to the embodiment of the present invention, the on/off switching unit 27 may include an AC-DC converter 21 for converting the generated AC electric power to DC electric power and the AC-DC converter 21 supply power VG for operating the driving unit 24. In addition, after the operating power VG is sufficiently supplied from the AC-DC converter 21 to the driving unit 24, the time delay unit 25 may be provided for delaying a signal output from the AC-DC converter 21 to provide the delayed signal to the driving unit 24 so that the driving unit 24 is turned on.

The driving unit 24 may be implemented to have a structure connecting an "on" signal provided from the on/off switching unit 27 with first to fourth transistors (for example, NPN-type transistors) for performing switching by the control signal of the control unit 23.

At this point the first and second transistors Q1 and Q2 of the driving unit 24 have a structure in which operating power VCC provided from the power unit 22 and operating power VG corresponding to the "on" signal provided from the on/off switching unit 27 is respectively provided from inputs (for example, collector terminals), an output (for example, an emitter terminal) of the second transistor Q2 is connected with the first terminal S of a solenoid of the power switching unit 26, and an output (the emitter terminal) of a first transistor Q1 is connected with the second terminal R of the solenoid. In addition, an input (a collector terminal) of a third transistor Q3 is connected to the first terminal S of the solenoid, an output (an emitter terminal) is connected to the ground terminal, an input (a collector terminal) of a fourth transistor Q4 is connected to the second terminal R of the solenoid, and an output (an emitter terminal) is connected to the ground terminal.

According to the configuration, when the "on" signal from the on/off switching unit 27 is applied to the base terminal of the first and fourth transistor Q1 and Q4 in a "high" state, the first and fourth transistor Q1 and Q4 are turned on, the current flows from the second terminal R to the first terminal S of the solenoid of the latching relay of the power switching unit 26 so that the solenoid is energized, contact points C3 and C4 of the latching relay come into contact with each other, and the power is supplied to the power unit 22.

Meanwhile, when the press knob 14 of the self-generating on/off switch 1 according to the first embodiment as illustrated in FIG. 1 is pressed in order to turn off the power of the product, contact points C1 and C2 of the tact switch 15 come into contact with each other and the contact point C1 has a configuration in which the contact point C1 is connected with microcomputer input I1 of the control unit 23 and provided with power VCC for operating the corresponding product through a resistance R1, and the contact point C2 is connected to the ground terminal. Accordingly, the contact points C1 and C2 come into contact with each other, a signal in a low state is supplied to the microcomputer input I1 of the control unit 23.

In the same manner, when the stick-shaped press knob 2 of the self-generating on/off switch 1 according to the second terminal as illustrated in FIG. 2 is pressed, the signal in the low state by the photo-coupler 5 is configured to be supplied to the input I1 of the microcomputer U1.

When the input I1 of the microcomputer U1 of the control unit 23 is in a low state, the control unit 23 may be configured so that an output O1 is output in a high state and applied to the base terminal of the second and third transistors Q2 and Q3 of the driving unit in order to cut off power supply. At this point, the control unit 23 is accordingly configured so that the second and third transistors Q2 and Q3 are turned on, the current flows from the first terminal S to the second terminal R of the solenoid of the latching relay of the power switching unit 26 so that the solenoid is energized, contact points C3 and C4 are separated, and the power supply to the power unit 22 is cut off.

Hereinafter, the operation of the standby power cut-off apparatus according to the present invention is described in more detail. When, for example, the dial knob 11 configured on the plate 16 illustrated in FIG. 1 is rotated in order to generate the initial electricity for turning on the power of the product, the permanent magnets 13 in the dial knob 11 rotate and N poles and S poles alternate, and the current flows in the coil 8 mounted in the press knob 14, thereby generating the electricity.

In addition, according to another method, when the stick-shaped press knob 2 is pressed in the A direction as illustrated in FIG. 2, the pinion gear 6 interlocked with the rack gear structure of the stick-shaped press knob 2 rotates so that the rotor of the generator 7 is rotated, thereby generating electricity.

The electricity generated in this way may be an alternating current. In this case, the alternating current is converted to the direct current by the AC-DC converter 21 as illustrated in FIG. 2 so that the driving power VG is supplied to the driving unit 24. In order to safely drive the latch relay 26 of the power switching unit 26[u1], after the power VG of the driving unit is stabilized, the "on" signal is delayed by the time delay unit so that the "on" signal of the power is supplied to the driving unit 24 after a certain time. The "on" signal supplied to the driving unit 24 is applied to the base terminal of the first and fourth transistors Q1 and Q4 of the driving unit 24 in a high state and the first and fourth transistors Q1 and Q4 are turned on so that the current flows from the second terminal R to the first terminal S of the solenoid of the latching relay so that the solenoid is energized, contact points C3 and C4 of the latching relay come into contact with each other, and the power is supplied to the power unit 22.

If the power is supplied to the power unit 22, the power unit 22 generates and supplies the power required for the product. When the required power is supplied to the control unit 23, the control unit 23 starts to control and perform the function of the product.

Meanwhile, the operation for powering off the normally operating product is described herein. When the press knob 14 of FIG. 1 is pressed, the knob of the tact switch 15 mounted under the press knob 14 is pressed, the contact points C1 and C2 of the tact switch 15 come into contact with each other so that the resistance R1 is connected in series and the input I1 of the microcomputer U1 becomes a low state.

In another way, when the stick-shaped press knob 2 illustrated in FIG. 2 is pressed in the A direction, the stick-shaped press knob 2 blocks the light transmitted by the photo-coupler 5 and the input I1 of the microcomputer U1 becomes a low state by the blocking of the light transmission.

When the input I1 of the microcomputer U1 of the control unit 23 is input in a low state, the microcomputer U1 determines to turn off the power and supplies the output O1 of the microcomputer U1 in the high state. The output O1 is applied to the base terminal of the second and third transistors Q2 and Q3 of the driving unit 24 so that the second and third transistors Q2 and Q3 are turned on. Accordingly, the current flows from the first terminal S to the second terminal R of the solenoid of the latching relay so that the solenoid is energized in an opposite state from the "on" state, and contact points C3 and C4 of the latching relay are separated to cut off the power supplied to the power unit 22, thereby completely cutting off the standby power.

As described above, the present invention may embody the on/off switch and the standby power cut-off apparatus using the on/off switch, and accordingly perform the on/off switching operation and the standby power cut-off operation. In the meantime, the present invention is described above with specific embodiments, but various modifications may be possible without departing from the scope of the invention.

Figure 4:
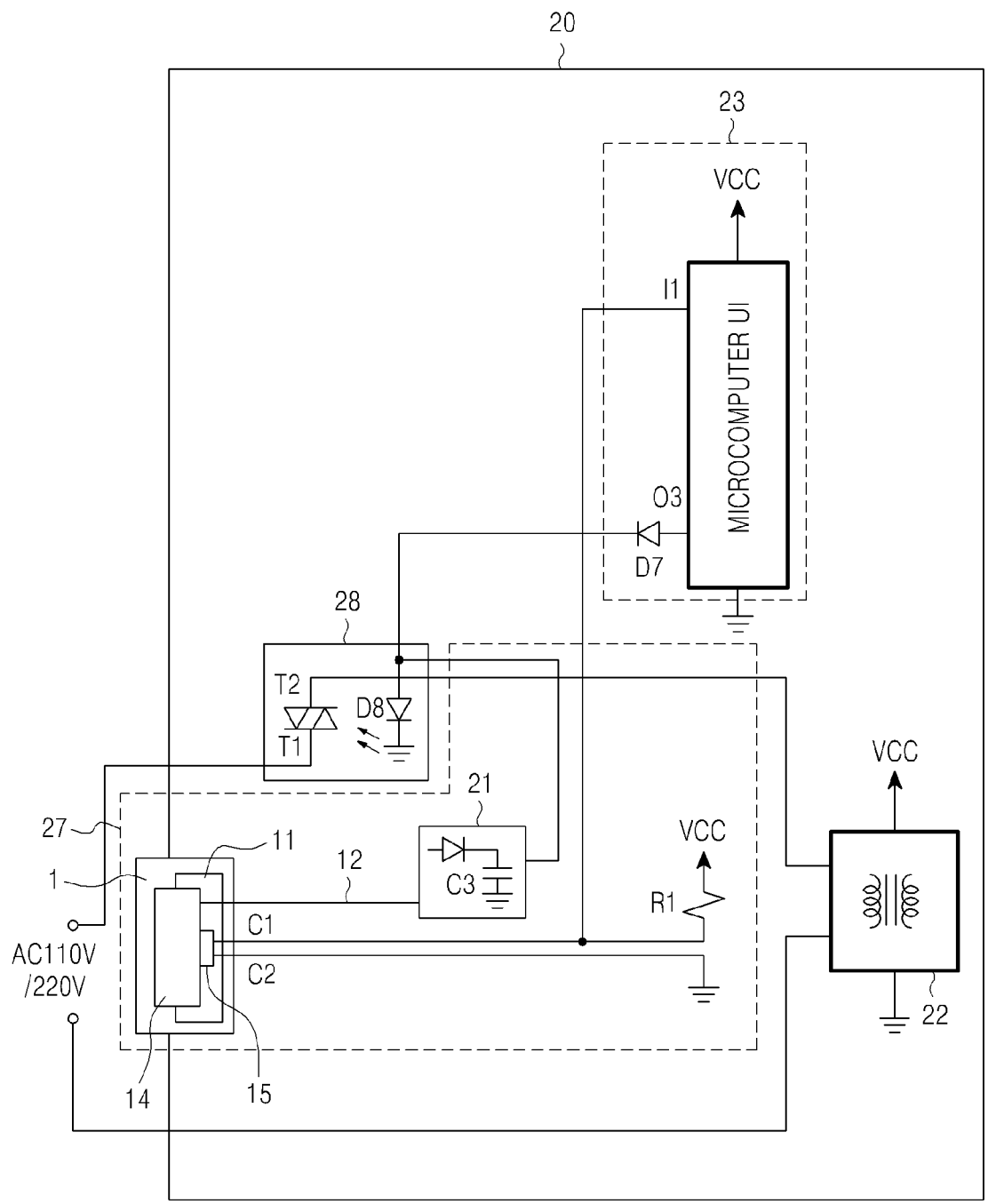
FIG. 4 is a block diagram illustrating a circuit of the corresponding units in the appliance/electronic product provided with the standby power cut-off apparatus according to the second embodiment of the present invention.

For example, in the embodiment described above, the "on" signal generated from the on/off switching unit 27 is provided to the driving unit 24, and the driving unit 24 drives the power switching unit 26, but it may be possible that the "on" signal generated from the on/off switching unit 27 directly drives the power switching unit 26. With reference to FIG. 4, this operation will be described in more detail.

FIG. 4 is a block diagram illustrating a circuit of the corresponding units in the appliance/electronic product provided with the standby power cut-off apparatus according to the second embodiment of the present invention. The configuration according to the second embodiment illustrated in FIG. 4 is mostly similar to the configuration of the first embodiment illustrated in FIG. 3. However, the second embodiment has a structure in which the roles of the driving unit 24 and the power switching unit 26 in the configuration of the first embodiment illustrated in FIG. 2 are performed in a power switching unit 28 configured by photo-triac which is a structure of connecting the photo-coupler and triac in the second embodiment illustrated in FIG. 4. In this case, it is regarded that the photo-coupler portion of the photo-triac functions as the driving unit, and the triac portion functions as the power switching unit.

That is, the second embodiment may have a structure in which the "on" signal (power) generated from an on/off switching unit 1 is supplied to a light emitting diode D8 of the photo-triac of the power switching unit 28, and the control signal output from the third output O3 of the microcomputer U1 of the control unit 23 is provided to the light emitting diode D8 of the photo-triac in common.

Accordingly, when the "on" signal (power) generated from the on/off switching unit 1 is supplied to the light emitting diode D8 of the photo-triac of the power switching unit 28, the photo-triac is turned on so that main transmission lines T1 and T2 of the photo-triac become connected. Accordingly, the power is supplied to the power unit 22, and the power unit 22 generates the power required for the product and provided for the product. At this point, when the power is supplied to the microcomputer U1 of the control unit 23, the microcomputer U1 makes the third output O3 in the high state and supplies the third output O3 the light emitting diode D8 of the photo-triac so that the photo-triac is continuously in a turn-on state and the power supply to the power unit 22 is continued.

Hereinafter, when the product is powered off, the microcomputer U1 of the control unit 23 outputs the third output O3 in the low state so that the power of the light emitting diode D8 of the photo-triac is cut off and the light is emitted. Accordingly, the photo-triac is turned off, the main transmission lines T1 and T2 of the photo-triac are cut off, the power supplied to the power unit 22 is cut off, and the standby power becomes zero.

As described above, the standby power cut-off apparatus using the photo-triac according to the second embodiment of the present invention is configured, and in this case, the on/off switching unit 27 may not be provided with the time delay unit 25, as provided in the first embodiment illustrated in FIG. 3.

The invention claimed is:
1. A standby power shutoff device of an appliance/electronic product, the standby power shutoff device comprising:
an on/off switching unit for an on/off operation of the appliance/electronic product that generates an "on" signal and an "off" signal of the product;
a power unit that provides power for operating internal function units of the product by being provided with external input power;
a power switching unit that is driven by a driving signal and cuts off or connects a power supply path of the external input power supplied to the power unit;
a control unit that generates a control signal for powering off the product by the "off" signal generated from the on/off switching unit; and
a driving unit that obtains driving power by on-signal power generated from the on/off switching unit, drives the power switching unit to connect the power supply path, and drives the power switching unit to cut off the power supply path according to a control signal for powering off supplied from the control unit,
wherein the self-generating on/off switch unit comprises a self-generating on/off switch that self-generates power by a mechanical movement of a first knob according to a turning-on control, and generates the "on" signal with the power, and that generates the "off" signal according to contact-or-separation of the contact point by an operation of the first knob or a second knob provided in addition to the first knob according to a turning-off control.

2. The standby power shutoff device according to claim 1, wherein the on/off switching unit comprises an AC-DC converter that converts AC power generated from the self-generating on/off switch to DC power so that the AC-DC converter provides an "on" signal for driving power of the driving unit, and provides an "on" signal by delaying the signal output from the AC-DC converter for a predetermined time so that the driving unit drives the power switching unit to connect the power supply path.

3. The standby power shutoff device according to claim 1, wherein the self-generating on/off switch comprises:
a tube-shaped dial knob that has a hollow installed on a plate in a rotatable manner, as the first knob; and
a press knob that is provided in the hollow and can be pressed,
wherein a plurality of permanent magnets for power generation with N poles and S poles alternately arranged is installed inside the dial knob, a coil for power generation is installed in the press knob, and a current corresponding to the "on" signal is generated by rotating the dial knob and by an interaction between the permanent magnets and the coil through the coil.

4. The standby power shutoff device according to claim 3, further comprising:
a tact switch that is connected with the press knob,
wherein the contact point of the tact switch is connected when the press knob is pressed, and the "off" signal of the on/off switching unit is generated by an operation of the tact switch.

5. The standby power shutoff device according to claim 1, wherein the self-generating on/off switch comprises:
a generator;
a rotatable pinion gear that is connected with a rotor of the generator; and
a stick-shaped press knob that has a rack gear structure connected with the pinion gear, as the first knob,
wherein the pinion gear interlocked with the rack gear structure of the stick-shaped press knob rotates by a movement according to an operation of pressing the stick-shaped press knob to rotate the rotor of the generator so that a current corresponding to the "on" signal is generated.

6. The standby power shutoff device according to claim 5, further comprising:
a photo-coupler in which light generated from a light emitting diode is blocked not to be input to a receiving element by a movement of the stick-shaped press knob,
wherein the "off" signal of the on/off switching unit is generated according to an output of the photo-coupler.

7. A self-generating on/off switch for an on/off operation of an appliance/electronic product, the self-generating on/off switch comprising:
an on-switch module that self-generates power by a mechanical movement of a first knob according to a turning-on control of the appliance/electronic product, and generates an "on" signal with the power; and
an off-switch module that generates an "off" signal according to contact-or-separation of the contact point by an operation of the first knob or a second knob provided in addition to the first knob according to a turning-off control of the appliance/electronic product.

8. The self-generating on/off switch according to claim 7, further comprising:
an AC-DC converter that converts the power generated from the on-switch unit to DC power, and
a time delay unit that delays a signal output from the AC-DC converter for a predetermined time.

9. The self-generating on/off switch according to claim 7, wherein the on-switch module comprises:
a tube-shaped dial knob that has a hollow installed on a plate in a rotatable manner, as the first knob; and
a press knob that is provided in the hollow of the dial knob and can be pressed, as the second knob,
wherein a plurality of permanent magnets for power generation with N poles and S poles alternately arranged is installed inside the dial knob, a coil for power generation is installed in the press knob, and a current corresponding to the "on" signal is generated by rotating the dial knob and by an interaction between the permanent magnet and the coil through the coil.

10. The self-generating on/off switch according to claim 9, wherein the on-switch module further comprises:
a tact switch that is connected with the press knob,
wherein the contact point of the tact switch is connected when the press knob is pressed, and the "off" signal of the on/off switching unit is generated by an operation of tact switch.

11. The self-generating on/off switch according to claim 7, wherein the on-switch module comprises:
a generator;
a rotatable pinion gear that is connected with a rotor of the generator; and
a stick-shaped press knob that has a rack gear structure connected with the pinion gear, as the first knob,
wherein the pinion gear interlocked with the rack gear structure of the stick-shaped press knob rotates by a movement according to an operation of pressing the stick-shaped press knob to rotate the rotor of the generator so that a current corresponding to the "on" signal is generated.

12. The self-generating on/off switch according to claim 11, wherein the off-switch module comprises:
a photo-coupler in which light generated from a light emitting diode is blocked not to be input to a receiving element by a movement of the stick-shaped press knob,
wherein the "off" signal of the on/off switching unit is generated according to an output of the photo-coupler.

* * * * *